US006330380B1

(12) United States Patent
Young et al.

(10) Patent No.: US 6,330,380 B1
(45) Date of Patent: Dec. 11, 2001

(54) M INPUT PORT BY N OUTPUT PORT OPTICAL SWITCHING SYSTEM

(75) Inventors: Eddie H. Young, Melbourne, FL (US); Faramarz Frank Ghassemi, San Jose, CA (US)

(73) Assignee: NEOS Technologies, Inc., Melbourne, FL (US)

( * ) Notice: Subject to any disclaimer, the term of this patent is extended or adjusted under 35 U.S.C. 154(b) by 0 days.

(21) Appl. No.: 09/604,699

(22) Filed: Jun. 22, 2000

Related U.S. Application Data

(63) Continuation of application No. 09/303,468, filed on Apr. 30, 1999, now Pat. No. 6,091,867, which is a continuation of application No. 08/850,498, filed on May 2, 1997, now Pat. No. 5,903,687.

(51) Int. Cl.[7] .......................... G02B 6/26
(52) U.S. Cl. .......................... 385/17; 385/18; 385/22
(58) Field of Search .......................... 359/520; 385/16–23

(56) References Cited

U.S. PATENT DOCUMENTS

| | | | |
|---|---|---|---|
| 4,201,442 | 5/1980 | McMahon et al. | 350/96.14 |
| 4,385,799 | 5/1983 | Soref | 350/96.19 |
| 4,521,069 | 6/1985 | Ikeda | 350/96.13 |
| 5,050,951 | 9/1991 | Caron et al. | 385/17 |
| 5,090,791 * | 2/1992 | Kidder et al. . | |
| 5,199,088 * | 3/1993 | Magel . | |
| 5,208,880 * | 5/1993 | Riza et al. . | |
| 5,319,477 * | 6/1994 | DeJule et al. . | |
| 5,325,224 | 6/1994 | Lang et al. | 359/139 |
| 5,436,986 * | 7/1995 | Tsai . | |
| 5,440,654 | 8/1995 | Lambert, Jr. | 385/17 |
| 5,619,601 | 4/1997 | Akashi et al. | 385/16 |
| 5,982,515 * | 11/1999 | Stone et al. . | |

FOREIGN PATENT DOCUMENTS

| | | | |
|---|---|---|---|
| 1 422 864 | 1/1976 | (DE) | H04Q/1/52 |
| 1 526 414 | 9/1978 | (DE) | H04B/9/00 |
| 4101044 | 12/1991 | (DE) | 385/18 |
| 2 187 861A | 9/1987 | (GB) | G02F/1/315 |
| 1-154017 | 6/1989 | (JP) | 385/18 |

* cited by examiner

*Primary Examiner*—Hung N. Ngo
(74) *Attorney, Agent, or Firm*—Allen, Dyer, Doppelt, Milbrath & Gilchrist, P.A.

(57) ABSTRACT

An M×N optical switching system has a plurality of M optical input ports, each of which is directs a respectively associated optical input beam along one of M spaced apart coplanar parallel input optical paths intersecting an optical coupling path. N optical output ports are installed of the input ports at spaced apart locations of the optical coupling path. Each optical output ports receives a respective optical signal along one of N spaced apart coplanar output optical paths that intersect the optical coupling path apart. M+N mirrors are alignable with a normal bisecting a common angle at a respective intersection of the M input optical paths and the N output optical paths with the optical coupling path. A plurality of actuators controllably move selected mirrors into and out of the optical coupling path, so as to cause an optical signal incident at a selected one of the M optical input ports to be coupled to a selected one of the N optical output ports.

8 Claims, 2 Drawing Sheets

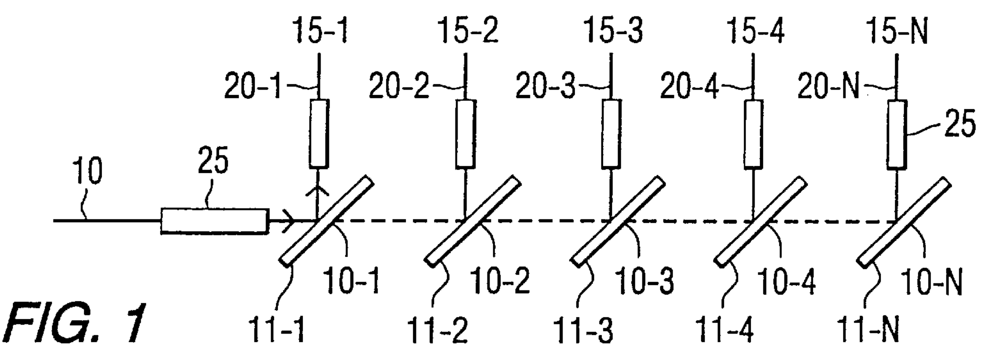
FIG. 1
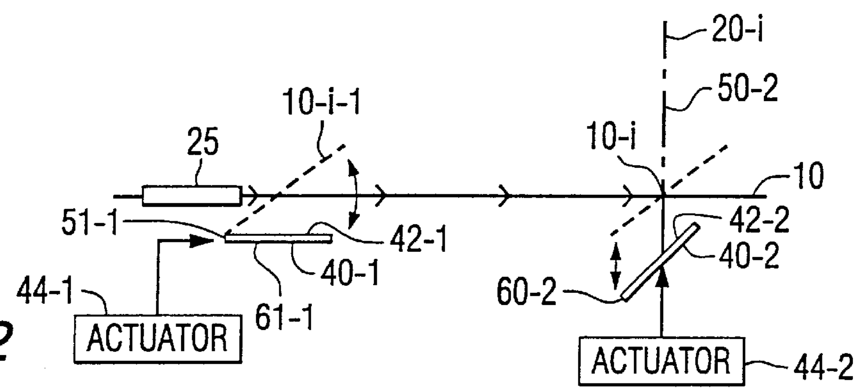
FIG. 2
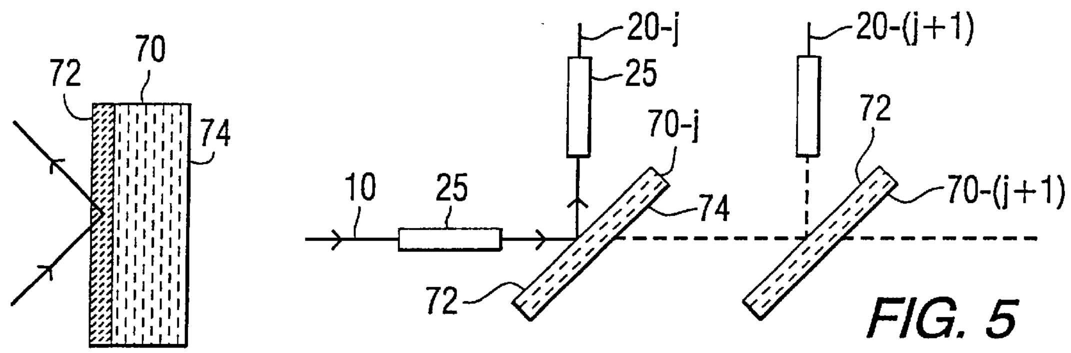
FIG. 3
FIG. 5
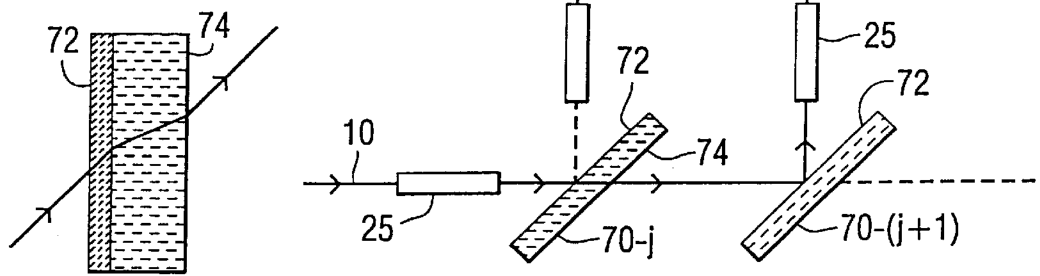
FIG. 4
FIG. 6

M INPUT PORT BY N OUTPUT PORT OPTICAL SWITCHING SYSTEM

This is a continuation of U.S. application Ser. No. 09/303,468, filed Apr. 30, 1999 now U.S. Pat. No. 6,091, 867, which is a continuation of parent U.S. application Ser. No. 08/850,498, filed May 2, 1997, now U.S. Pat. No. 5,903,687, issued May 11, 1999.

FIELD OF THE INVENTION

The present invention relates in general to optical beam control and distribution systems, and is particularly directed to a new and improved multiport optical switching system, which contains first and second sets of optical deflection elements, such as translatable or rotatable mirrors, that are optically coupled with plural optical input and output ports, respectively, and are selectively displaced by associated actuators, so as to cause a selected optical input port to be coupled to a selected optical output port.

BACKGROUND OF THE INVENTION

As the number of industries utilizing optical communications and light beam (e.g., laser) technology continues to increase, there is a substantial need for optical switching system implementations that can be readily integrated into everyday types of user equipments, including both free space optical transport units and those which use fiber optic components, such as computer workstations, telecommunication switches, measuring and testing devices, medical instruments, surgical equipment, and the like. Unfortunately, currently existing optical switching systems that have been proposed for such applications are mechanically impractical, especially in a limited volume hardware environment, are cumbersome to use (often involving the physical movement of an optical fiber), have limited port switching capacity, and are relatively slow.

SUMMARY OF THE INVENTION

In accordance with the present invention, such drawbacks of conventional optical switching systems are effectively obviated by an M input N output multiport optical switching system, which is operative to selectively and individually couple one of a plurality of optical input ports with one of a plurality of optical output ports by means of a relatively compact arrangement of optical deflection elements. Light light beam paths coupled with said optical input and output ports may include optical fibers and beam collimating elements (e.g., collimating lenses). The optical deflection elements may comprise translatable or rotatable mirrors, that are selectively displaced by associated actuators, such as solenoid or piezoelectric devices, so as to cause a selected optical input port to be rapidly coupled to a selected optical output port.

Pursuant to a first aspect of the invention, a 1×N output optical beam switching system is configured to controllably direct or steer an individual incoming light beam, such as a modulated or unmodulated laser beam, supplied over single input beam path, into a selected one of a plurality of N optical output ports associated output beam paths for which are orthogonal to and intersect the input beam path. The switching system includes a plurality (N−1) of controlled optical deflection elements installed at a plurality of locations along the input beam path, and an additional, or Nth optical deflection element disposed in the input beam path optically downstream of the (N−1)th controlled optical deflection element. Each controlled optical deflection element is selectively controlled by an associated actuator to deflect the incoming light beam into a respectively associated output beam port/path, or to pass the beam therethrough to downstream deflector elements.

As will be described, each controlled optical deflection element may comprise a translatable mirror that is oriented at a prescribed angle (e.g., 45°) relative to each of the direction of the input beam path and its associated output beam path, so that the input light beam will be deflected by its reflective surface at an angle that is generally transverse (e.g., 90°) to the input optical beam path and therefore into the associated orthogonal output beam path. The mirror may be mounted to an electrically controlled actuator, such as a solenoid-based or piezoelectric transducer-based actuator, which is operative to physically displace the mirror into and out of the input beam path, so as to control whether or not the reflective surface of the mirror deflects the light beam into its output beam path or allows the beam to pass therebeyond to a downstream mirror.

Physical displacement of a mirror may be translational, or rotational. Alternatively, rather than employ a physically displaceable mirror, a respective controlled optical deflection element may comprise a functionally equivalent device, that is operative to controllably deflect or pass the incident light beam, but does so without being physically displaced. As a non-limiting example, such a controlled light beam deflector element may comprise a controlled medium-containing element, which functions as a mirror or as a transmitter in accordance with the application of control stimulus, such as a medium transmissivity-modifying voltage to the element.

A non-limiting example of a material whose reflective and transmissivity properties vary in response to an external stimulus is a liquid crystal, whose molecular orientation is affected by the application of a control voltage. However, because currently commercially available liquid crystal-based light beam deflector components have an efficiency of less than one hundred percent efficient, their performance is degraded relative to that of a displaceable mirror. Still, as such controlled transmissivity and reflectivity materials are improved to an acceptable efficiency level (ideally one hundred percent), their use in the present invention will be capable of achieving a performance level comparable to that of a displaceable mirror.

In order to direct an incoming beam to a selected output port/path, the actuators associated with each of the light beam deflectors optically upstream of the light beam deflector associated with the output path of interest are controllably operated, so as to cause their controlled deflector elements to pass the incident beam to the selected light beam deflector. The selected light beam deflector is positioned in the input beam path so that it deflects the incident beam along the desired output path.

Pursuant to a second aspect of the invention, an M×1 input optical beam switching system is configured to controllably steer a selected one of a plurality of incoming light beams into a single optical beam path that is orthogonal to and intersects each of the input beam paths. Such an M×1 input beam switching includes a plurality a plurality of input beam ports to which the input beams are applied. Input beam paths associated with the input ports are generally orthogonal to the single output beam path. As in the 1×N optical switch embodiment, the light beam paths may be free space or include optical transport materials such as optical fibers.

Installed at a first location of the single output beam path is a reflector element, such as a first mirror oriented at 45° relative to each of its associated input path and the single output beam path, so as to deflect light traveling along its input beam path onto the single output beam path. Further installed at a plurality of locations along the output beam path are respective ones of a plurality of (M−1) controlled optical deflection elements. As in the 1×N switch described above, each controlled optical deflection element is selectively operable to deflect a light beam traveling along its associated input path onto its orthogonal (output beam) path. When a respective displaceable deflector is positioned so that its reflective surface does not coincide with the intersection of its two intersecting orthogonal beam paths, then a light beam incident along its input path will be either directed to the rear surface of an immediate downstream mirror, or will pass by the mirror.

In order to direct an incoming beam travelling on a selected input beam path onto the single output beam path, the actuators associated with each of the light beam deflectors optically downstream of the light beam deflector at the beam path location of interest are controllably driven so as to cause these downstream controlled deflector elements to prevent an incident beam travelling along any of the downstream input beam paths from being deflected onto the single output beam path. In addition, the light beam deflector at the beam path location of interest is positioned at its mutual 45° angle at the intersection of the input beam path of interest and the single output beam path, so as to deflect the selected input beam along the single output beam path. Any beam incident upon an upstream input path will be either blocked by the rear surface of the so positioned deflector, or will not be incident on the single path, for example as a result of being allowed to bypassed a rotated out-of-the-way mirror.

To provide an M×N optical switch, the M×1 optical switch and the 1×N optical switch are coupled in cascade such that the single beam path of the M×1 optical switch is coincident with the input beam path of the 1×N optical switch.

BRIEF DESCRIPTION OF THE DRAWINGS

FIG. 1 diagrammatically illustrates an embodiment of a 1×N optical switch in accordance with the invention;

FIG. 2 diagrammatically illustrates a displaceable mirror as a controlled optical deflection element;

FIGS. 3 and 4 diagrammatically illustrate a controlled light beam deflector element configured as a controlled medium-containing element;

FIGS. 5 and 6 diagrammatically illustrate the manner in which controlled medium light deflection elements may be installed at respectively spaced apart locations of a light beam path;

DETAILED DESCRIPTION

Figure 7:
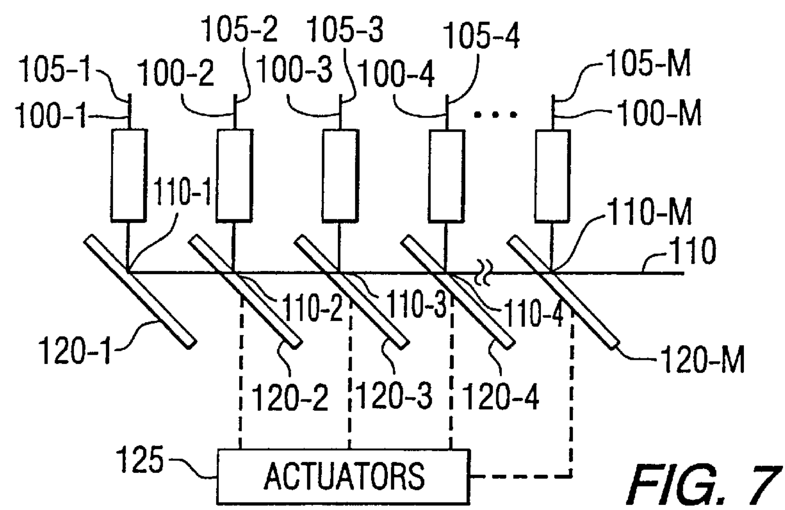
FIG. 7 diagrammatically illustrates an embodiment of an M×1 optical switch in accordance with the invention.

FIG. 1 diagrammatically illustrates a 1×N optical switching system in accordance with the present invention, which is operative to controllably direct a light beam, such as a modulated or unmodulated laser beam, traveling along single input beam path 10 into a selected one of a plurality of N optical output ports 15-1, 15-2, 15-3, 15-4, . . . , 15-N, respectively associated with output beam paths 20-1, 20-2, 20-3, 20-4, . . . , 20-N. To provide a practical implementation of the switch, in terms of mounting of components, each of the output beam paths 20 is preferably coplanar with and orthogonal to beam path 10.

As described above, the light beam paths may include optical components diagrammatically shown at 25, such as optical fibers and collimating lenses for collimating light beams travelling through the fibers, as are typically employed for transmission of optical signals or telecommunication signals in electronic sensor equipments, such as optical time domain reflectometers. In a free space optical switching system, such as one used for the selective switching of the output beam of a laser to one of a plurality of output devices, as in industrial or medical (surgical) applications as non-limiting examples, the collimated laser output beam paths may be coupled directly to a utility instrument (such as a laser surgery instrument head).

Installed at a plurality of locations 10-1, 10-2, 10-3, 10-4, . . . , 10-N−1 along the input beam path 10 are respective ones of a plurality of controlled optical deflection elements 11-1, 11-2, 11-3, 11-4, . . . , 11-N−1. An additional or Nth optical deflection element 11-N is disposed in the input beam path 10 optically downstream of the controlled optical deflection element 11-N−1. Each controlled optical deflection element 11-i is selectively operative to deflect a light beam traveling along path 10 and incident thereon into a respectively associated output beam path 20-i, while optical deflection element 11-N deflects a light beam traveling along path 10 and incident thereon into output beam path 20-N.

For this purpose, as diagrammatically illustrated in FIG. 2, the controlled optical deflection element may comprise displaceable mirrors, shown at 40-1 and 40-2 and oriented at a prescribed angle (e.g., 45°) relative to the direction of input beam path 10, so that their reflective surfaces 42-1 and 42-2 are inclined relative to the incident direction of the light beam 10. When a respective mirror is so oriented, an incident light beam will be deflected by reflective surface 42-1, 42-2 at an angle that is generally transverse (e.g., 90°) to optical beam path 10. Each mirror may be mounted to an electrically controlled actuator 44-1, 44-2, such as a solenoid-based or piezoelectric transducer-based actuator, which is operative to physically displace the mirror into and out of the beam path 10, thereby controlling whether or not the reflective surface of the mirror intercepts and thereby deflects the light beam.

Physical displacement of a mirror may be translational, as shown by a linear actuator 44-2 associated with the mirror 40-2. Linear actuator 44-2 is operative to linearly translate mirror 40-2 along a path 50-2 that coincides with the associated output beam path 20-i, such that mirror 40-1 is controllably translated between light beam path intercepting position 10-i, from which an incident light beam is reflected along path 20-i, and a second position 60-2, at which mirror 40-2 is out of the way of the path 10. When the mirror 40-2 is translated out of the light beam path 10, a light beam travelling along path 10 is allowed to bypass the mirror 40-2 and travel toward the next downstream mirror position.

Alternatively, physical displacement of a mirror may be rotational or pivotable, as diagrammatically illustrated for the mirror 40-1 in FIG. 2. For the case of a rotatable mirror, its associated actuator 44-1 is operative to rotate mirror 40-1 about a pivot location 51-1, such that the mirror 40-1 is controllably rotated between its light beam path intercepting position 10-i–1, from which an incident light beam is reflected along path 20-i–1, and a second position 61-1, at which mirror 40-1 has been pivoted out of the way of the light beam path 10 (for example rotated through an angle of 45°, so as to be effectively parallel to and thereby fully clearing the light beam path 10). Again, when the mirror 40-1 is rotated out of the light beam path 10, a light beam travelling along path 10 is allowed to bypass the mirror 40-1 and travel toward the next downstream mirror position.

As a further alternative, rather than employ a physically displaceable light deflector element (such as a linearly translatable or rotatable mirror, as diagrammatically shown in FIG. 2, described above), a respective controlled optical deflection element may comprise a functionally equivalent light control element, that is installed in the light beam path, and is operative to controllably deflect or pass an incident light beam, but does so without being physically displaced. As a non-limiting example, such a controlled light beam deflector element may comprise a controlled medium-containing element, an individual one of which is diagrammatically illustrated at 70 in FIGS. 3 and 4.

As shown therein, whether the element 70 functions as a mirror or as a transmitter depends upon the application of control stimulus, such as a medium transmissivity-modifying voltage to the element. When the element is off (no control voltage applied), it acts as a transmitter, so that light incident on its front surface 72 is allowed to pass through the element and continue on downstream from its exit surface 74. Conversely, when the element 70 is turned on (by the application of a prescribed control voltage), the element 70 acts as a mirror so that incident light is reflected from its front or mirror surface 72.

FIGS. 5 and 6 diagrammatically illustrate the manner in which such respective controlled medium light deflection elements 70-j and 70-(j+1) are installed at respective locations 10-j and 10-(j+1) of beam path 10, being oriented at 45° relative to the path. In FIG. 5, element 70-j is turned on, so that it reflects the incident light beam into output beam path 20-j, whereas in FIG. 6, element 70-j is turned off, so that it passes the incident light beam to downstream element 70-(j+1), which is turned on so as to deflect the beam into output beam path 20-(j+1).

A non-limiting example of a material whose reflective and transmissivity properties vary in response to an external stimulus is a liquid crystal, whose molecular orientation is affected by the application of a control voltage. Because currently commercially available liquid crystal-based light beam deflector components have an efficiency of less than one hundred percent efficient (e.g., on the order of ninety percent), their use in the present invention would result in degraded performance (path leakage and spillover). However, as such materials continue to be industrially refined and eventually reach an improved efficiency level (ideally one hundred percent), their use in the present invention will be capable of achieving a performance level akin to physically translatable mirror components, described above. Consequently, the present invention contemplates the use of such controlled medium (e.g., liquid crystal type) components as equivalent to physically displaceable deflector elements, described above.

In operation, in order to direct an incoming beam travelling on light beam path 10 a selected ith one of the N output beam paths 20, the actuators associated with each of the light beam deflectors 11 optically upstream of the light beam deflector 11-i at beam path location 10-i, is controllably driven so as to cause such upstream controlled deflector elements to allow the incident beam to impinge upon light beam deflector 11-i, and be deflected thereby along path 20-i. For example, if the light beam is to be deflected along path 20-3, the actuator associated with each of upstream deflectors 11-1 and 11-2 is driven, so that deflectors allow the beam to pass downstream to deflector 11-3, which is positioned in the path 10 and thereby deflects the beam along output beam path 20-3. Where controlled beam deflectors 11-1 and 11-2 are displaceable, they are displaced 'off-axis' of the path 10, so that the beam has an unobstructed path to beam deflector 11-3.

Similarly, if the light beam traveling along input path 10 is to be deflected along output path 20-N, the actuators associated with upstream deflectors 11-1 to 11-N–1 are driven so that these deflectors allow the beam to pass downstream to deflector 11-N and be deflected along output beam path 20-N. Likewise, if the light beam is to be deflected along path 20-1, there being no upstream light beam deflector relative to deflector 11-1, then no actuator is driven and the beam is deflected along output beam path 20-1, which intercepts the beam at location 10-1 in light beam path 10.

Figure 10:
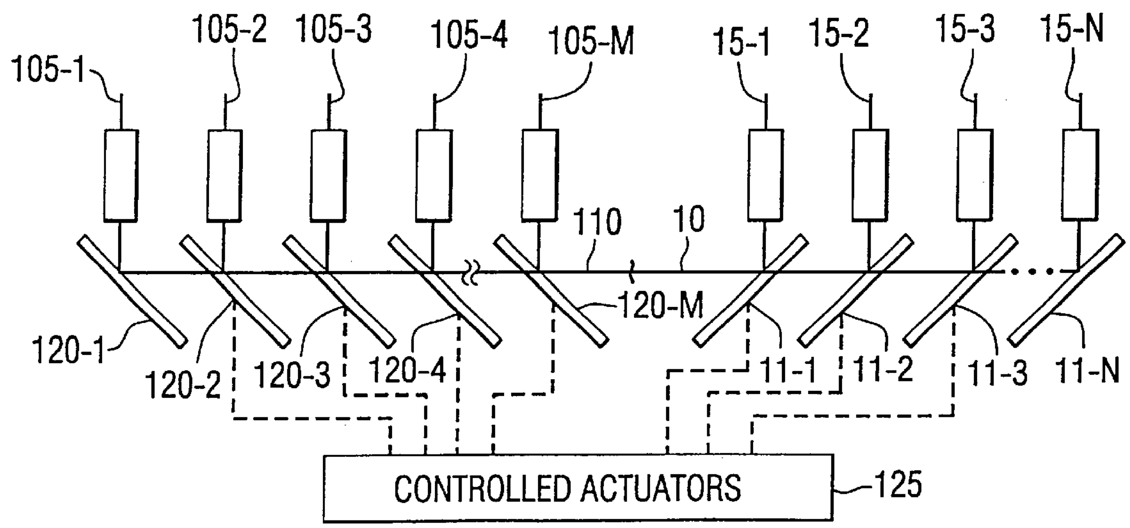
FIG. 10 diagrammatically illustrates an M×N optical switch, comprised of an optically cascaded connection of the M×1 optical switch of FIG. 7 and the 1×N optical switch of FIG. 1.

FIG. 7 diagrammatically illustrates an M×1 optical switching system in accordance with the present invention, which is operative to controllably direct a selected one of a plurality of light beams applied along a plurality of input beam paths 100-1, 100-2, 100-3, 100-4, . . . , 100-M to respective input ports 105-1, 105-2, 105-3, 105-4, . . . , 105-M into a single beam path 110. Input beam paths 100-1, 100-2, 100-3, 100-4, . . . , 100-M are generally transverse to beam path 110 and, as in the 1×N optical switch embodiment of FIG. 1, are preferably orthogonal to and coplanar with path 110. To provide an M×N optical switch, the M×1 optical switch of FIG. 7 and the 1×N optical switch of FIG. 1 are coupled in cascade such that the single beam path 110 of the M×1 optical switch is coincident with the input beam path 10 of the 1×N optical switch, as shown in FIG. 10, and with each of the input and output beam paths being coplanar with one another, so as to facilitate hardware mounting an required geometrical positioning of the switch components.

Installed at a first location 110-1 of output beam path 110 is a reflector element 120-1, such as a mirror oriented at 45° relative to paths 100-1 and 110, so as to deflect light traveling along path 100-1 onto path 110. Further installed at a plurality of locations 110-2, 110-3, 110-4, . . . , 110-M along the output beam path 110 are respective ones of a plurality of controlled optical deflection elements 120-2, 120-3, 120-4, . . . , 120-M. As in the embodiment of FIG. 1, each controlled optical deflection element 120-2 to 120-M is selectively operable by means of an associated actuator of a set of actuators diagrammatically shown at 125, to deflect a light beam traveling along its associated input path 100 onto output beam path 110.

For this purpose, as in the previous embodiment, each controlled optical deflection element may comprise a translatable mirror oriented at a prescribed angle (e.g., 45°) relative to the direction of each of the mutually orthogonal beam paths 100-i and 110, and having its reflective surface facing the incident direction of the light beam along beam path 100-i. When a respective mirror is so oriented, an incident light beam on path 100-i will be deflected at an angle that coincides with optical beam path 110. As in the first embodiment, such a mirror may be mounted to an electrically controlled actuator such as a solenoid-based or piezoelectric transducer-based actuator, which is operative to physically displace the mirror into and out of the beam path 110, thereby controlling whether or not the reflective surface of the mirror intercepts and thereby deflects the light beam along the path 110.

Figure 8:
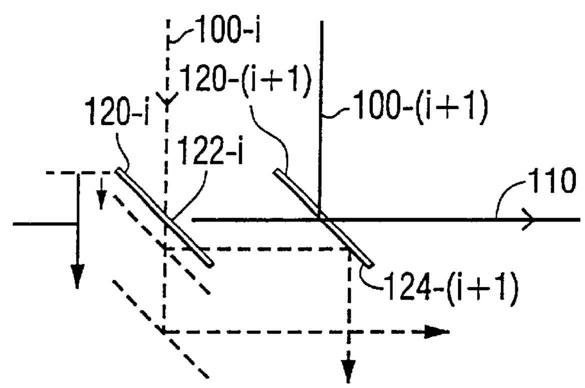
FIG. 8 diagrammatically illustrates a light beam incident on the rear surface of an immediate downstream translatable mirror.
Figure 9:
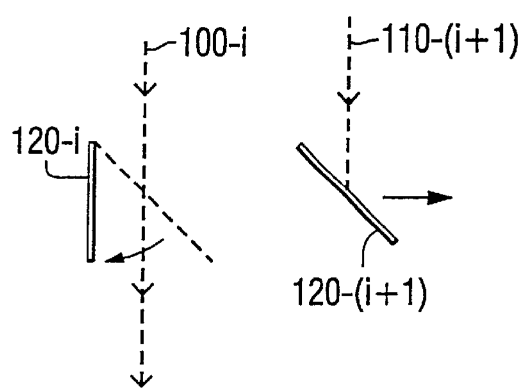
FIG. 9 diagrammatically illustrates a pivotable mirror positioned so that incident light passes by the mirror.

When a respective displaceable deflector 120-i is positioned so that its reflective surface 122-i does not coincide with the intersection of beam paths 100-i and 110, then a light beam incident along path 100-i either be directed to by-pass or impinge upon an off-axis portion of the rear surface 124-(i+1) of an immediate downstream mirror 120-(i+1) (in the case of the mirror being translatable along the input beam path 100-i, as shown in FIG. 8), or will pass by the mirror 120 (in the case of the mirror being rotatable or pivotable to be out of the way of input path 100-i, as shown in FIG. 9).

Moreover, as in the first embodiment, rather than light deflector element 120 being physically displaceable, it may comprise a functionally equivalent light control element, that is installed in the light beam path, and is operative to controllably deflect or pass an incident light beam, but does so without being physically displaced. Again, such a controlled light beam deflector element may comprise a controlled medium-containing element, an individual one of which is diagrammatically illustrated at 70 in FIGS. 3–6, described above.

In operation, in order to direct an incoming beam travelling on a selected ith one of the light beam paths 100-1 . . . 100-M, onto beam path 110, the actuators associated with each of the light beam deflectors 120 optically downstream of the light beam deflector 120-i at beam path location 100-i are controllably driven so as to cause these downstream controlled deflector elements to prevent an incident beam travelling along any of paths 100-i+1 . . . 100-M from being deflected onto path 110, on the one hand, and to cause the light beam deflector 120-i at beam path location 100-i to deflect the beam incident along path 100-i to be deflected optically downstream along path 110. Any beam incident upon an upstream input path 100-i–k will be either blocked by the rear surface of deflector 120-i, if deflected by an upstream deflector 120-i–k (as in the case of a linearly translatable deflector element), or will not be incident on path 110 (as in the case of a rotational deflector element).

For example, if an incoming light beam on input path 100-3 is to be deflected along path 110, the actuators associated with each of downstream deflectors 120-4 to 120-M are driven, so that these deflectors allow a beam deflected by deflector 120-3 into path 110 and pass downstream past deflectors 120-4 to 120-M. As in the first embodiment, where controlled beam deflectors 120-4 to 120-M are displaceable, they are displaced 'off-axis' of the path 110, so that the beam deflected by deflector 120-3 is unobstructed as it travels along path 110. Similarly, if an incoming light beam on input path 100-M is to be deflected along path 110, no actuators is driven, so that the beam is deflected by deflector 120-M into path 110. Likewise, if an incoming light beam on input path 100-1 is to be deflected along path 110, all actuators 120-2 . . . 120-M are driven, so that the beam deflected by deflector 120-1 into path 110 has an unobstructed travel path through output beam path locations 110-1 . . . 100-M.

As pointed out above and with reference to FIG. 10, an M×N optical switch is readily configured by cascading the M×1 optical switch of FIG. 7 and the 1×N optical switch of FIG. 1, such that the single beam path 110 of the M×1 optical switch of FIG. 7 is coincident with the input beam path 10 of the 1×N optical switch of FIG. 1. A set of controlled actuators 125 selectively displaces the mirrors 120 of the M×1 front end and the mirrors 11 of the 1×N rear end to provide the input/output beam port connectivity.

As will be appreciated from the foregoing description, the previously described shortcomings of conventional optical switching systems are effectively obviated by the M×N optical switching system of the present invention, which is operative to selectively and individually couple any selected one of a plurality of optical input ports to any selected one of a plurality of optical output ports by means of a relatively compact arrangement of optical deflection elements installed at intersections of input and output beam paths orthogonally intersecting and being coplanar with a single coupling beam path.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An apparatus for controlling the travel path of a light beam comprising:

a plurality of light beam directing elements, each comprising a moveable reflector and adapted to be controllably positioned relative to a first path of said light beam, and being operative, in response to a light beam direction control signal applied thereto, to be either inserted into said first path so as to direct said light beam into a respective second path of a second plurality of second paths, or to be located out of said first path so as to allow said light beam to continue to travel along said first path; and a light beam direction control signal generator, coupled to said plurality of light beam directing elements and being operative to apply a first light beam direction control signal to a first selected one of said plurality of light beam directing elements, and thereby cause said first selected one of said plurality of light beam directing elements to be controllably inserted into said first path of said light beam so as to cause said light beam to travel along a respective second path.

2. An apparatus according to claim 1, wherein said light beam direction control signal generator is further operative to controllably apply a second light beam direction control signal to one or more selected others of said plurality of light beam directing elements, so as to locate said one or more selected others of said plurality of light beam directing elements out and thereby allow said light beam to continue to travel along said first path.

3. An arrangement according to claim 2, wherein said plurality of controlled optical direction elements are adapted to be controllably rotated into and out of said first path.

4. An arrangement according to claim 2, wherein said plurality of controlled optical direction elements are adapted to be controllably translated into and out of said first path.

5. A method for controllably directing a light beam comprising the steps of:

(a) positioning, in a first path of said light beam, a plurality of light beam directing elements, each comprising a moveable reflector and operative, in response to light beam direction control signals therefor, to controllably direct said light beam into respective second paths, or to allow said light beams to continue to travel along said first path; and (b) applying a first light beam direction control signal to a selected one of said plurality of light beam directing elements, and thereby controllably direct said light beam into a respective second path associated therewith; and (c) applying a second light beam direction control signal to one or more selected others of said plurality of light beam directing elements, so as to allow said light beam to continue to travel along said first path.

6. A method of controlling the travel path of light beam comprising the steps of:

(a) providing a plurality of light beam directing elements each comprising a moveable reflector, each of which, in response to a respective light beam direction control signal applied thereto, is adapted to be either controllably inserted into a first travel path of said light beam so as to deflect said light beam into a second path, or to be positioned out of said first path and thereby allow said light beam to continue to travel along said first path; and (b) applying a first light beam direction control signal to a first selected one of said plurality of light beam directing elements, and thereby controllably inserting said selected one of said plurality of light beam directing elements into said first path and causing said light beam to travel along said second path; and (c) applying a second light beam direction control signal to one or more selected others of said plurality of light beam directing elements, so as to locate said one or more selected others of said plurality of light beam directing elements out of said first path and thereby allow said light beam to continue to travel along said first path.

7. An apparatus for controlling the travel path of a light beam comprising:

a plurality of light beam directing elements each comprising a moveable reflector, each of which is adapted to be inserted into a first travel path of said light beam at an angle of 45° with respect to said first path and is operative, in response to a light beam direction control signal applied thereto, to either controllably deflect said light beam into a second travel path, or allow said light beam to continue to travel along said first travel path; and a light beam direction control signal generator, which is coupled to said plurality of light beam directing elements, and being operative to apply said first light beam direction control signal to a first selected one of said plurality of light beam directing elements, and thereby controllably insert said first selected one of said plurality of light beam directing elements into said first travel path, causing said light beam to be directed thereby into said second travel path.

8. An arrangement according to claim 7, wherein said light beam direction control signal generator is operative to apply a second light beam direction control signal to one or more selected others of said plurality of light beam directing elements, so as to cause said one or more selected others of said plurality of light beam directing elements to be located out of said first travel path and allow said light beam to continue to travel along said first travel path.

* * * * *